United States Patent [19]
Cadiou

[11] 4,082,987
[45] Apr. 4, 1978

[54] METHOD AND CONTROL DEVICE FOR SWITCH MEANS ADAPTED TO MODIFY THE COUPLING OF GROUPS OF ELEMENTS OF AN ELECTROCHEMICAL GENERATOR SUPPLYING AN ELECTRIC MOTOR

[75] Inventor: Jean Cadiou, Paris, France

[73] Assignee: Societe Anonyme Automobiles Citroen, France

[21] Appl. No.: 396,804

[22] Filed: Sep. 13, 1973

[51] Int. Cl.² .............................................. H02P 7/06
[52] U.S. Cl. ................................. 318/139; 318/345 C
[58] Field of Search ............... 318/139, 327, 332, 343, 318/345, 390, 395, 411–413

[56] References Cited
U.S. PATENT DOCUMENTS

| | | | |
|---|---|---|---|
| 3,207,966 | 9/1965 | Parkinson | 318/412 |
| 3,249,836 | 5/1966 | Stamm | 318/139 |
| 3,264,540 | 8/1966 | Dannettell | 318/139 |
| 3,581,175 | 5/1971 | Merz | 318/327 |
| 3,702,959 | 11/1972 | LeGloan | 318/139 |

*Primary Examiner*—Robert K. Schaefer
*Assistant Examiner*—John J. Feldhaus
*Attorney, Agent, or Firm*—Stevens, Davis, Mille & Mosher

[57] ABSTRACT

The method is especially suitable for two identical groups of elements, and for supplying a continuous current traction motor. The commutating means modifies the coupling of groups of elements from parallel to series and conversely, as a function of the power demanded for driving the motor. The current supply of the motor is ensured by pulses delivered by a chopper type device monitored as a function of the power demanded. The commutating means e.g. a thyristor are actuated in synchronism with the operation of the chopper type device.

9 Claims, 3 Drawing Figures

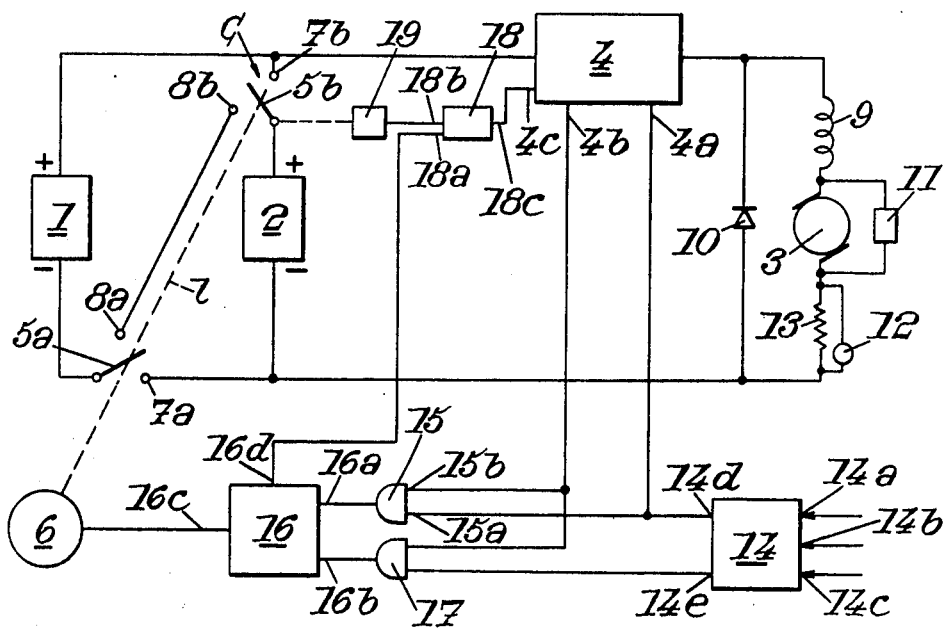
Fig.1.
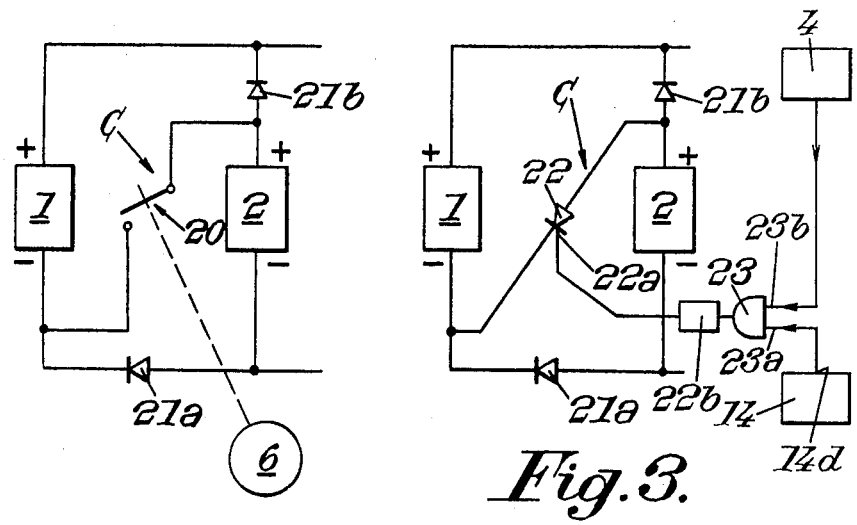
Fig.2.
Fig.3.

METHOD AND CONTROL DEVICE FOR SWITCH MEANS ADAPTED TO MODIFY THE COUPLING OF GROUPS OF ELEMENTS OF AN ELECTROCHEMICAL GENERATOR SUPPLYING AN ELECTRIC MOTOR

The invention relates to a method for the control of commutating means of at least two groups of elements, for example identical, of an electrochemical generator for supplying an electric motor, for example a direct current traction motor, which commutating means being adapted to modify the coupling of groups of parallel elements in series, and conversely, as a function of the power required for driving the motor, the supply of current of the motor being ensured by pulses delivered by a device of the chopper type monitored as a function of the power required.

The invention relates more particularly, because it is in this case that its application seems to have the most advantage, but not exclusively, to the coupling of an electrochemical generator and an electric motor for driving an automobile vehicle.

Applicant has provided a method and device, according to U.S. application Ser. No. 398,381, filed Sept. 18, 1973, entitled "Method and Control Device for Series and Parallel Coupling of Elements of an Electrochemical Generator Supplying a Motor", for adopting the parallel or series coupling of the groups of elements of an electrochemical generator which enables the desired result to be obtained with the best yield, according to the conditions of operation of the motor and especially according to the power demanded and the rotational speed of the motor.

By reason of extremely variable conditions of operation, especially for an automobile vehicle motor, the means for commutating or switching, to modify the coupling are required to function very frequently.

It is a particular object of the invention, to render the control method such that it responds to the various exigencies of practice better than hitherto and especially so that it ensures good operation of the commutating means, with control means of simple construction.

According to the invention, a control method of the type previously defined is characterised by the fact that the commutating means are controlled in synchronous conjunction with the operation of the device of the chopper type.

When the commutation means are electromechanical a switching order is transmitted to the abovesaid commutating means only when the chopper device has cut off the delivery of the electrochemical generator and only allows a new current pulse to pass to the motor when the switching is in fact terminated; the switching order can ensure with a slight time delay the cut off of the current delivered by the chopper type device.

When the switch means are electronic and at least their closing must be actuated by an electrical signal, the abovesaid closing is actuated by the monitoring signals actuating the closing of the chopper device; the closing of the electronic switching means is hence effected at the same frequency as the closing of the chopper and in synchronism with this closing.

The invention also relates to a switch device for at least two groups of elements, for example identical, of an electrochemical generator for supplying an electric motor, especially a continuous current traction motor, the device comprising switch means adapted to modify the coupling of groups of parallel elements in series, and conversely, as a function of the power demanded for driving the motor and a device of the chopper type, monitored as a function of the power demanded, ensuring the current supply of the motor by pulses, which switching device is characterised by the fact that it comprises means for actuating said switch means in synchronism with the operation of the chopper type device.

Preferably, these actuating means are constituted by an "AND" gate of which one input receives a signal connected with the operation of the chopper.

When the switch means are of the electromechanical type, said signal is a signal for the opening of the chopper whilst when the switch means are electronic, said signal is a chopper closing signal.

The invention consists, apart from the features mentioned above, of certain other features which will be more explicitly considered below, with regard to preferred embodiments of the invention described in detail with reference to the accompanying drawings, but which are in no way limiting.

FIG. 1 of these drawings is a diagram of one embodiment of a commutating device for the application of a method according to the invention.

FIG. 2 shows a modification of the construction of a portion of the embodiment of FIG. 1.

FIG. 3, lastly, shows a further embodiment of a device according to the invention using electronic commutating means.

Referring to FIG. 1, there can be seen an electrochemical generator comprising at least two groups of identical elements 1, 2, intended to supply an electric motor 3, for example a continuous current traction motor. Preferably, this motor 3 is of the series type, especially when it is intended for driving a vehicle.

The current supply of the motor 3 is ensured by pulses delivered by a chopper type device 4 (also known under the name "chopper"), monitored as a function of the power required by the motor 3.

Commmutating means C are adapted to modify the coupling of the parallel groups 1 and 2 in series, and conversely, as a function of the power demanded for driving the motor 3.

In the embodiment of the invention shown in FIG. 1, the commutating means C are electromechanical and comprise two commutators including movable arms 5a, 5b connected mechanically by a connection 1 forming for example, the movable member of an electromagnet having an actuating coil 6. The movable arms 5a, 5b are connected respectively to the negative pole of the group 1 and to the positive pole of the group 2.

The assembly is arranged so that when the arm 5a comes into contact with a stud 7a, connected to the negative pole of the group 2, the arm 5b comes into contact with the stud 7b, connected to the positive pole of the group 1. The groups 1 and 2 are then coupled in parallel for the supply of the motor 3.

When the arm 5a comes into contact with the stud 8a, the arm 5b comes into contact with the stud 8b which is connected electrically to the stud 8a. The groups 1 and 2 are then coupled in series.

A coil 9 is mounted between the output of the chopper device 4 and the motor 3, in conventional manner, in order to "smooth" the pulses delivered by the chopper 4, that is to say in order to reduce the variations in intensity of the induced current of the motor 3. A conventional diode 10 called "free wheel" is connected, as seen in FIG. 1, to the terminals of the assembly of the inductance 9 and the motor 3, so as to close the circuit when the chopper device 4 does not deliver pulses.

A circuit 11 is connected as a branch circuit to the terminals of the motor 3 to take up the average induced voltage from this motor, whilst an amperemetric circuit 12, with its shunt 13 mounted in series with the motor 3, supplies a voltage proportional to the intensity of current passing through the motor coil.

The information supplied by the circuits 11 and 12 enables the production, for example as explained in detail in the aforementioned U.S. application Ser. No. 398,381 of actuating signals for the passage from series coupling to parallel coupling or conversely, so as to ensure the operation of the motor 3 with a minimum of losses in the electrochemical generator.

There has been diagrammatically shown at 14 the circuits enabling the production of the actuating signals for the commutating means C. The circuit 14 comprises three inputs 14a, 14b, 14c fed respectively by signals depending on the average voltage at the terminals of the motor 3, on the average intensity of current passing through the induction of the motor 3 and on a reference voltage constituting a monitoring of the chopper 4 and representing the torque required by the driver of the vehicle at the motor 3.

The circuit 14 comprises two outputs, 14d, 14e. When the conditions of operation of the motor 3 are such that the series coupling of the groups 1 and 2 is necessary, a signal appears at the output 14d. When the parallel coupling of the groups 1 and 2 can ensure the supply of the motor 3 under the conditions of operation at the moment, a signal appears at the output 14e.

According to a modification (not shown) the circuit 14 could only comprise one output and the commutating means could be arranged so that in the absence of a signal at this output, the groups 1 and 2 are coupled in a predetermined manner (in parallel or in series). When a signal would appear at the single output of the circuit 14 the other coupling (series or parallel) would then be actuated.

The output 14d is connected to an input 4a of the chopper device 4. When a signal appears at this input 4a, the opening of the chopper 4 is actuated (the opening corresponding to the non-conducting condition of the chopper 4 and to the absence of a current pulse at the output of this chopper connected to the motor).

The output 14d is in addition connected to an input 15a of an "AND" gate 15. This gate has a second input 15b connected to one terminal 4b of the chopper 4; a signal appears at this terminal 4b when the chopper 4 is open (non-conducting). The output from the gate 15 is connected to an input 16a of a bistable flip-flop 16.

The output 14e of the circuit 14 is connected to the other input 16b of the flip-flop 16 through an "AND" gate 17 having two inputs connected respectively to the terminal 4b and to the output 14e.

The output 16c from the flip-flop 16 is connected to the winding 6.

Another output 16d from the flip-flop 16 is connected to an input 18a of a bistable flip-flop 18. This flip-flop comprises another input 18b connected to a circuit 19 adapted to emit a signal when the movable contacts 5a, 5b are closed. The output 18c of the flip-flop 18 is connected to an input 4c of the chopper 4. When a signal is present at this input 4c, the closing of the chopper 4 is prevented.

This being the case, the operation of the device of FIG. 1 is as follows.

It is assumed that the groups 1 and 2 are initially coupled in parallel and that the conditions of operation of the motor 3 are such that a signal appears at the output 14d to actuate the coupling in series of the groups.

This signal from the output 14d is transmitted to the input 4a of the chopper 4 and to the input 15a of the gate 15.

The opening of the chopper 4 is actuated by the signal fed to the input 4a and, as soon as the chopper 4 is open, a signal appears at the output 4b. This signal is transmitted to the input 15b of the gate 15 which then allows a signal to pass to its output, which signal is fed to the input 16a of the bistable flip-flop 16. This bistable flip-flop 16 changes state and the winding 6 actuates the switching from parallel to series.

It may be noted that a connection between the output 14e and the input 4a of the chopper 4 is not indispensible since the chopper 4 is open periodically when the groups 1 and 2 are coupled in series and the conditions of operation of the motor are such that the parallel coupling can be actuated. The opening signal is then obtained at the output 4b.

The beginning of commutation, that is to say the moment when the contacts 5a, 5b are separated from the stud on which they were resting, is produced although the chopper 4 is open and no current circulates in the commutating means. As a result the risks of starting an electric arc are eliminated and the electromechanical contacts can be of small dimensions, and of relatively low cost since they do not have to cut off the current passing through the induction of the motor 3.

The opening of the chopper 4 is maintained, due to the prevention signal emerging from the flip-flop 18, this signal being released by the pulse appearing at the output 16d, at each change of state of the flip-flop 16.

The flip-flop 18 is reset to zero by the signal delivered by the circuit 19 at the end of switching, which causes the prevention signal at the output 18c to disappear. The commutation order hence ensures with a time delay the cut off of the current delivered by the chopper 4.

As previously explained, due to the actuation of the commutating means C of FIG. 1, in synchronous connection with the operation of the chopper 4, more especially with its opening, the commutation is ensured under the best conditions for electromechanical contactors.

As a result there is an extended life duration of these electromechanical contactors, and a lightening permitting a great speed of operation.

According to the embodiment shown in FIG. 2, the commutating means C comprise a single electromechanical contactor constituted by a switch 20 connected between the negative pole of one group, for example group 1, and the positive pole of the other group. This switch 20 is actuated by the winding 6. The negative pole of the group 2 is connected to the negative pole of the group 1 through a diode 21a adapted to conduct the negative pole of the group 2 to the negative pole of the group 1. One of the terminals of the switch 20 is connected to one point of the circuit comprised between the diode 21a and the negative pole of the group 1. The two positive poles of the groups 1 and 2 are connected through a diode 21b arranged between the positive pole of the group 1 and the junction point of the other terminal of the switch 20 with the positive pole of the group 2. The utilisation circuit is connected on one hand, between the diode 21b and the positive pole of the group 1 and, on the other hand, between the diode 21a and the negative pole of the group 2. The diode 21b conducts from the positive pole of the group 2 to the utilisation circuit. The other elements of the device of FIG. 1, not shown in FIG. 2, are preserved and the operation is identical with that previously described.

According to another modification, the commutation means C are electronic and constituted by a controlled rectifier device, especially a thyristor 22 (FIG. 3) replacing, in a way, in the assembly of FIG. 2, the switch 20. The anode of the thyristor 22 is connected to a point situated between the positive pole of the group 2, and the diode 21b. The cathode of the thyristor 22 is connected to a point situated between the negative pole of the group 1 and the diode 21a. The control electrode or trigger electrode 22a of the thyristor is connected through a trigger actuating circuit 22b, to the output of an "AND" gate 23. This "AND" gate comprises two inputs 23a, 23b. The input 23a is connected to the output 14d of the circuit 14 on which the order for coupling in series appears. The input 23b receives the pulses actuating the closing of the chopper 4.

The operation of a device according to the invention in which the commutation means C are such as shown in FIG. 3, is as follows.

When the thyristor 22 is blocked, the groups 1 and 2 are coupled in parallel.

When the conditions of operation of the motor 3 require series coupling, a signal appears at the output 14d (FIG. 1) and is transmitted to the input 23a of the gate 23 (FIG. 3). This signal is maintained as long as the conditions of operation of the engine require series coupling.

When a pulse for the release of the chopper 4 appears at the input 23b, the gate 23 delivers at its output a signal transmitted to the trigger 22a and the thyristor 22 becomes conductive which causes series coupling of the groups 1 and 2.

When the current pulse delivered by the chopper 4 ceases, the current passing through the thyristor 22 is annulled and the latter is blocked. It will be noted that the trigger 22a no longer receives a signal since the release pulse of the chopper has ceased.

On the next release pulse of the chopper the thyristor 22 will again be made conductive.

It hence appears that, when series coupling of the groups 1 and 2 is necessary, this coupling is obtained during intervals of time when the chopper is conductive, the thyristor 22 operating in synchronism with the chopper 4.

In all cases, the commutation operates in synchronous liaison with the chopper without the disappearance of the motor couple, which eliminates jolts uncomfortable for the passengers.

I claim:

1. Apparatus for controlling a power supply for an electric motor comprising:
   at least two groups of electromechanical generating means for supplying electrical energy to said motor;
   means for monitoring at least one operating condition of said motor;
   chopper means coupled between the output of said at least two groups of generating means and an input of said motor for supplying pulse signals to energize said motor;
   commutation means coupled to said at least two groups of electrochemical generating means for switching the coupling of said at least two groups between series and parallel coupling as a function of said operating condition of said motor; and
   control means coupled to outputs of said monitoring means and chopper means and to an input of said commutation means for synchronizing the switching of said commutation means with the pulse producing operation of said chopper means.

2. The apparatus according to claim 1, wherein said control means comprises at least one AND gate having a first input coupled to an output of said chopper means and a second input coupled to an output of said monitoring means, said gate having an output coupled to said commutation means.

3. The apparatus according to claim 2, wherein said gate means generates an output signal when a signal corresponding to the opening of said chopper means appears at said first input concurrently with a signal corresponding to the condition monitored by said monitoring means appearing at said second input.

4. The apparatus according to claim 2, wherein said commutation means comprises electronic switch means having first and second terminals coupled to respective ones of said generating means and a control electrode coupled to said AND gate output; and wherein a signal appears at said first gate input upon the closing of said chopper means.

5. The apparatus according to claim 4, wherein said electronic switch means comprises a thyristor.

6. A method for controlling the supply of power to an electric motor from at least two groups of electrochemical generating means, comprising the steps of:
   chopping the output signal from said generating means to provide a pulse signal input to said motor;
   monitoring at least one operating condition of said motor; and
   switching the connections of said at least two groups between series and parallel electrical connections in synchronism with the chopping of said generating means output signal and as a function of said monitored operating condition.

7. The method according to claim 6, further comprising:
   switching said electrical connections of said at least two groups only during the period of time that the output signal of said generating means is cut off from being transmitted to said motor; and
   resuming said chopping operation only after said switching of said electrical connections has been completed.

8. A method of operating apparatus for controlling the supply of power to an electric motor, said apparatus comprising first and second electrochemical generating means, commutation means coupled to said first and second electrochemical generating means for switching said generating means between series and parallel connections, and chopper means coupling said generating means to said motor, said method comprising the steps of:
   chopping the output signal from said generating means to provide a pulse signal input to said motor,
   generating a series connection signal or a parallel connection signal depending upon the operating condition of said motor, and
   actuating said commutation means to switch said generating means in synchronism with the operation of said chopper means to a series or parallel connection when said series or parallel connection signal is generated respectively, and said chopper means is in its non-conducting state.

9. The method according to claim 8 further comprising the step of:
generating a prevention signal to prevent closing of said chopper means until said commutation means has completed the switching of said generating means, said prevention signal being coupled to said chopper means to delay delivery of current to said motor until switching of said generating means has been completed.

* * * * *

UNITED STATES PATENT AND TRADEMARK OFFICE
CERTIFICATE OF CORRECTION

PATENT NO. : 4,082,987

DATED : April 4, 1978

INVENTOR(S) : Jean CADIOU

It is certified that error appears in the above-identified patent and that said Letters Patent are hereby corrected as shown below:

Please insert the claim for French priority 72 33 457 of September 21, 1972

Signed and Sealed this

Tenth Day of October 1978

[SEAL]

Attest:

RUTH C. MASON
*Attesting Officer*

DONALD W. BANNER
*Commissioner of Patents and Trademarks*